US012663938B2

(12) United States Patent
Song

(10) Patent No.: US 12,663,938 B2
(45) Date of Patent: Jun. 23, 2026

(54) MEMORY CONTROLLER AND MEMORY SYSTEM THAT EXECUTES ERROR CORRECTION OPERATION

(71) Applicant: SK hynix Inc., Icheon-si (KR)

(72) Inventor: Choung Ki Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 510 days.

(21) Appl. No.: 17/735,635

(22) Filed: May 3, 2022

(65) Prior Publication Data

US 2023/0280930 A1 Sep. 7, 2023

(30) Foreign Application Priority Data

Mar. 4, 2022 (KR) ......................... 10-2022-0028390

(51) Int. Cl.
G06F 3/00 (2006.01)
G06F 3/06 (2006.01)

(52) U.S. Cl.
CPC .......... G06F 3/0655 (2013.01); G06F 3/0604 (2013.01); G06F 3/0679 (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | | |
|---|---|---|---|---|
| 6,229,742 B1 * | 5/2001 | Srinivasan | ........... | G11C 29/816 |
| | | | | 365/230.06 |
| 9,158,619 B2 | 10/2015 | Kobla et al. | | |
| 2001/0004326 A1 * | 6/2001 | Terasaki | ................ | G11C 29/16 |
| | | | | 257/679 |
| 2017/0017546 A1 * | 1/2017 | Qidwai | ............... | G06F 11/1048 |
| 2021/0103517 A1 * | 4/2021 | Kim | .................... | G06F 11/1068 |

FOREIGN PATENT DOCUMENTS

KR         102119179 B1      6/2020

* cited by examiner

*Primary Examiner* — Craig S Goldschmidt
(74) *Attorney, Agent, or Firm* — WILLIAM PARK AND ASSOCIATES LTD.

(57) ABSTRACT

A memory system may include: a memory device including a plurality of memory cells; and a memory controller configured to store, as a fail address, a first internal address that is generated during a first read operation when at least one memory cell that is accessed during the first read operation among the plurality of memory cells is determined to be a fail, and store, as alternative data, internal read data that is generated during the first read operation.

31 Claims, 18 Drawing Sheets

FIG.4

| IADD | AML | MF | MS |
|---|---|---|---|
| FADD<1> | AML<1> | '1' | '00' |
| FADD<2> | AML<2> | '1' | '01' |
| FADD<3> | AML<3> | '1' | '10' |
| FADD<4> | AML<4> | '1' | '11' |
| OTHERS | X | '0' | X |

FIG.6

| MS | DML | ALTD |
|------|---------|----------|
| '00' | DML<1> | ALTD<1> |
| '01' | DML<2> | ALTD<2> |
| '10' | DML<3> | ALTD<3> |
| '11' | DML<4> | ALTD<4> |

S201 — RST → SADD INITIALIZED

S203 — EVT ACTIVATED? — N

Y

S205 — SADD INCREASED & SCMD GENERATED

S207 — EFLAG ACTIVATED? — N

Y

S209 — SADD & IRDD STORE? — N

Y

S211 — STORE SADD AS FADD & STORE IDATA AS ALTD

MEMORY CONTROLLER AND MEMORY SYSTEM THAT EXECUTES ERROR CORRECTION OPERATION

CROSS-REFERENCES TO RELATED APPLICATIONS

The present application claims priority under 35 U.S.C. § 119(a) to Korean application number 10-2022-0028390, filed in the Korean Intellectual Property Office on Mar. 4, 2022, the entire disclosure of which is incorporated herein by reference in its entirety.

BACKGROUND

The present disclosure relates to a memory controller and a memory system for executing an error correction operation among data access operations.

Recently, in order to increase the operation speed of a memory device, methods for inputting/outputting 4-bit or 8-bit data in each clock cycle are used. When the input/output speed of data is increased, the probability that an error will occur while the data is transmitted also increases. Therefore, a separate device and method for guaranteeing the reliability of data transmission are additionally required.

According to a method for guaranteeing the reliability of data transmission, an error code for making it possible to check whether an error occurred may be generated and transmitted with data, whenever the data is transmitted. Examples of the error code may include an EDC (Error Detection Code) capable of detecting an occurrence of error, and an ECC (Error Correction Code) capable of correcting an error when the error occurred.

SUMMARY

In an embodiment, a memory system may include: a memory device including a plurality of memory cells; and a memory controller configured to store, as a fail address, a first internal address that is generated during a first read operation when at least one memory cell, among the plurality of memory cells, accessed during the first read operation, is determined to be a fail, and configured to store internal read data that is generated during the first read operation as alternative data.

In another embodiment, a memory controller may include: an error correction circuit configured to generate internal read data and an error flag by executing an error decoding operation based on memory read data including cell data and a cell syndrome, output from at least one memory cell, among a plurality of memory cells that are included in a memory device, accessed during a first read operation; and a data alternation control circuit configured to store a first internal address, generated during the first read operation, as a fail address based on the error flag and configured to store the internal read data as alternative data.

In another embodiment, a memory system may include: a memory device including a plurality of memory cells; and a memory controller configured to store a self address, generated during a self read operation that is executed in each event interval, as a fail address when at least one memory cell, among the plurality of memory cells, accessed by the self read operation, is determined to be a fail, and store internal read data that is generated during the self read operation as alternative data.

BRIEF DESCRIPTION OF THE DRAWINGS

FIG. 4 is a table for describing an operation of the match signal generation circuit in accordance with the embodiment.

FIG. 6 is a table for describing an operation of the alternative data generation circuit in accordance with an embodiment.

DETAILED DESCRIPTION

In the descriptions of the following embodiments, the term "preset" indicates that the value of a parameter is previously decided, when the parameter is used in a process or algorithm. According to an embodiment, the value of the parameter may be set when the process or algorithm is started or while the process or algorithm is performed.

Terms such as "first" and "second", which are used to distinguish among various components, are not limited by the components. For example, a first component may be referred to as a second component, and vice versa.

When one component is referred to as being "coupled" or "connected" to another component, it may indicate that the components may be directly coupled or connected to each other or coupled or connected to each other through another component interposed therebetween. On the other hand, when one component is referred to as being "directly coupled" or "directly connected" to another component, it may indicate that the components are directly coupled or connected to each other without another component interposed therebetween.

"Logic high level" and "logic low level" are used to describe the logic levels of signals. A signal having a "logic high level" is distinguished from a signal having a "logic low level." For example, when a signal having a first voltage corresponds to a "logic high level," a signal having a second voltage may correspond to a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level according to an embodiment, and a signal having a logic low level may be set to have a logic high level according to an embodiment.

"Logic bit set" may indicate a combination of logic levels of bits contained in a signal. When the logic levels of the bits contained in the signal are changed, the logic bit set of the signal may be differently set. For example, when two bits are contained in a signal, the logic bit set of the signal may be set to a first logic bit set, in case that the logic levels of the two bits contained in the signal are "logic low level and logic low level," and the logic bit set of the signal may be set to a second logic bit set, in case that the logic levels of the two bits contained in the signal are "logic low level and logic high level."

Hereafter, teachings of the present disclosure will be described in more detail through embodiments. The embodiments are only used to exemplify the teachings of the present disclosure, and the scope of the present disclosure is not limited by the embodiments.

Figure 1:
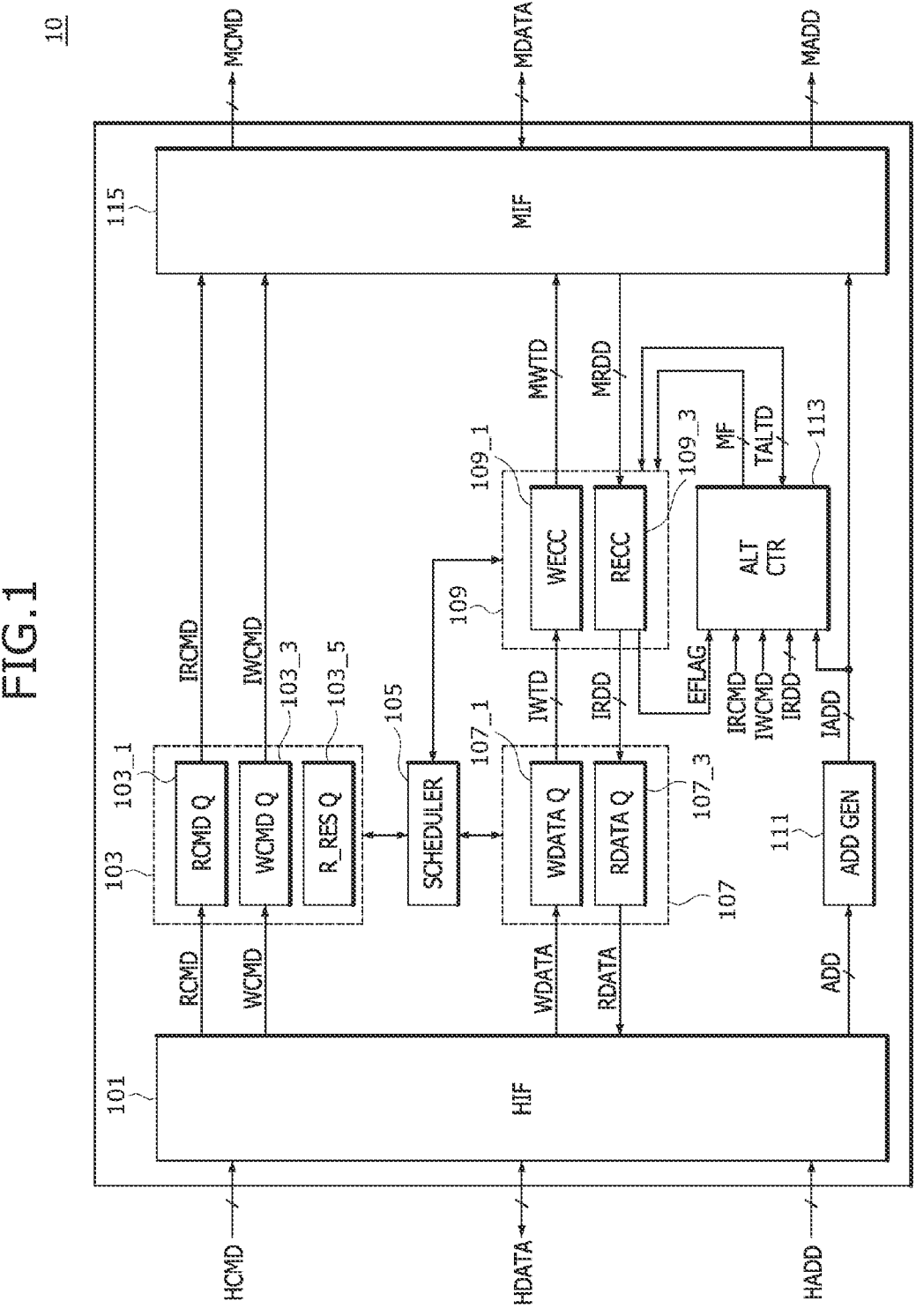
FIG. 1 is a block diagram illustrating the configuration of a memory controller in accordance with an embodiment.

FIG. 1 is a block diagram illustrating the configuration of a memory controller 10 in accordance with an embodiment. As illustrated in FIG. 1, the memory controller 10 may include a host interface (HIF) 101, a command queue 103, a scheduler 105, a data queue 107, an error correction circuit 109, an address generation circuit (ADD GEN) iii, a data alternation control circuit (ALT CTR) 113, and a memory interface (MIF) 115.

Figure 16:
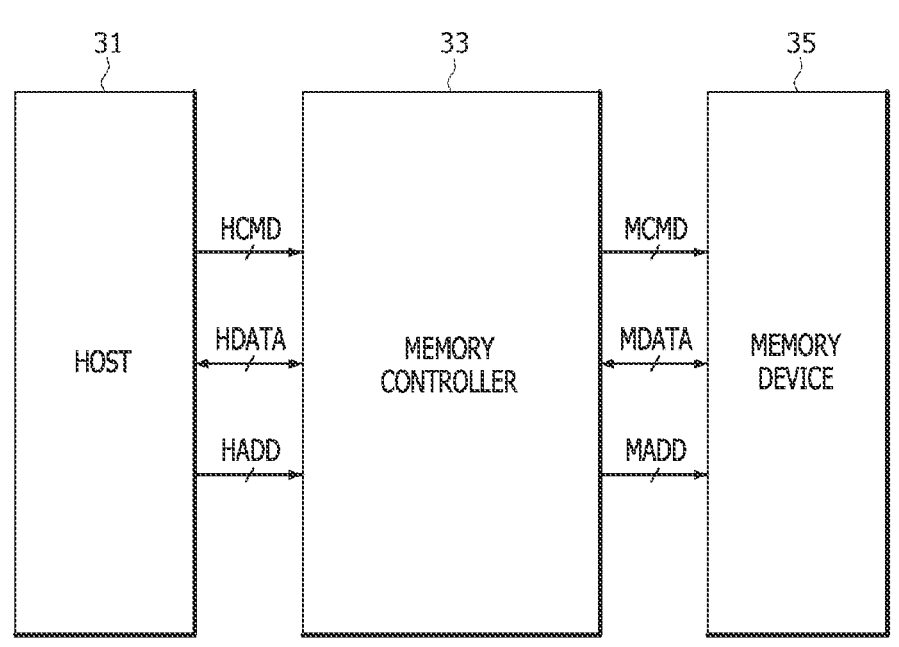
FIG. 16 is a block diagram illustrating the configuration of a memory system in accordance with an embodiment.

The host interface 101 may utilize a CXL (Compute eXpress Link), an AXI (Advanced eXtensible Interface), or a customized interface and may control the transmission of a host command HCMD, host data HDATA, and a host address HADD between the memory controller 10 and a host (31 of FIG. 16).

The command queue 103 may be coupled to the host interface 101 and the memory interface 115. During a data access operation, including a read operation and a write operation, the command queue 103 may receive a read command RCMD or a write command WCMD from the host interface 101 based on the host command HCMD and may store the received command. The command queue 103 may include a read command queue (RCMD Q) 103_1, a write command queue (WCMD Q) 103_3, and a read response queue (R_RES Q) 103_5.

For the read operation, the read command queue 103_1 may receive the read command RCMD from the host interface 101 based on the host command HCMD and may store the received read command RCMD. The read command queue 103_1 may apply relevant information to the scheduler 105 when the read command RCMD is stored. The read command queue 103_1 may be controlled by the scheduler 105 and may generate an internal read command IRCMD for the read operation based on the stored read command RCMD. The read command queue 103_1 may apply the internal read command IRCMD as a memory command MCMD to a memory device (35 of FIG. 16) through the memory interface 115. The read command queue 103_1 may apply the internal read command IRCMD to the data alternation control circuit 113.

For the write operation, the write command queue 103_3 may receive the write command WCMD from the host interface 101 based on the host command HCMD and may store the received write command WCMD. The write command queue 103_3 may apply relevant information to the scheduler 105 when the write command WCMD is stored. The write command queue 103_3 may be controlled by the scheduler 105 and may generate an internal write command IWCMD for the write operation based on the stored write command WCMD. The write command queue 103_3 may be coupled to the memory interface 115 and may apply the internal write command IWCMD as the memory command MCMD to the memory device (35 of FIG. 16) through the memory interface 115. The write command queue 103_3 may apply the internal write command IWCMD to the data alternation control circuit 113.

The read response queue 103_5 may be controlled by the scheduler 105 and may store a read response command R_RES during a period in which the read operation is executed by the read command RCMD that is stored in the read command queue 103_1. The read response queue 103_5 may be controlled by the scheduler 105 and may delete the stored read response command R_RES when the read operation is ended.

The scheduler 105 may receive the relevant information from the command queue 103 when the read command RCMD is stored and when the write command WCMD is stored. More specifically, the scheduler 105 may receive the relevant information from the read command queue 103_1 when the read command RCMD is stored and may receive the relevant information from the write command queue 103_3 when the write command WCMD is stored. The scheduler 105 may control the command queue 103 to generate and output the internal read command IRCMD, the internal write command IWCMD, and the read response command R_RES based on the read command RCMD and the write command WCMD. More specifically, the scheduler 105 may control the read command queue 103_1 to generate and output the internal read command IRCMD based on the read command RCMD, control the write command queue 103_3 to generate and output the internal write command IWCMD based on the write command WCMD, and control the read response queue 103_5 to store the read response command R_RES during a read operation period.

The scheduler 105 may receive the relevant information from the data queue 107 when write data WDATA is stored and when internal read data IRDD is stored. More specifically, the scheduler 105 may receive the relevant information from a write data queue 107_1 when the write data WDATA is stored and may receive the relevant information from a read data queue 107_3 when internal read data IRDD is stored. The scheduler 105 may control the data queue 107 to generate and output internal write data IWTD and the read data RDATA based on the write data WDATA and the internal read data IRDD. More specifically, the scheduler 105 may control the write data queue 107_1 to generate and output the internal write data IWTD based on the write data WDATA and may control the read data queue 107_3 to generate and output the read data RDATA based on the internal read data IRDD.

The scheduler 105 may control the error correction circuit 109 to generate memory write data MWTD by executing an error encoding operation based on the internal write data IWTD during the write operation and may control the error correction circuit 109 to generate the internal read data IRDD and an error flag EFLAG by executing an error decoding operation based on memory read data MRDD during the read operation.

The data queue 107 may be coupled to the host interface 101 and the error correction circuit 109. During the write operation, the data queue 107 may receive the write data WDATA from the host interface 101 based on the host data HDATA and may store the received data. During the read operation, the data queue 107 may receive the internal read data IRDD that is generated as the result of the error correction operation of the error correction circuit 109 and may store the received data. The data queue 107 may include the write data queue (WDATA Q) 107_1 and the read data queue (RDATA Q) 107_3.

For the write operation, the write data queue 107_1 may receive the write data WDATA from the host interface 101 based on the host data H DATA and may store the received write data WDATA. The write data queue 107_1 may apply relevant information to the scheduler 105 when the write data WDATA is stored. The write data queue 107_1 may be controlled by the scheduler 105 and may output the stored write data WDATA as the internal write data IWTD. For the write operation, the write data queue 107_1 may be coupled to a write error correction circuit (WECC) 109_1 and may apply the internal write data IWTD to the write error correction circuit 109_1.

For the read operation, the read data queue 107_3 may receive the internal read data IRDD from the error correction circuit 109 and store the received internal read data IRDD. The read data queue 107_3 may apply relevant information to the scheduler 105 when the internal read data IRDD is stored. The read data queue 107_3 may be controlled by the scheduler 105 and may output the stored internal read data IRDD as the read data RDATA. The read data queue 107_3 may apply the read data RDATA as the host data HDATA to the host (31 of FIG. 16) through the host interface 101.

The error correction circuit 109 may be coupled to the scheduler 105, the data queue 107, the data alternation control circuit 113, and the memory interface 115. During the write operation, the error correction circuit 109 may generate the memory write data MWTD by executing the error encoding operation based on the internal write data IWTD that is received from the data queue 107. During the read operation, the error correction circuit 109 may generate the error flag EFLAG and the internal read data IRDD by executing the error decoding operation based on the memory read data MRDD that is received from the memory interface 115. The error correction circuit 109 may apply the error flag EFLAG to the data alternation control circuit 113. The error correction circuit 109 may receive a match flag MF from the data alternation control circuit 113, the match flag MF being activated when a data access operation is executed on at least one memory cell that is accessed by an internal address IADD that is equal to one of fail addresses (FADD<1:4> in FIG. 3), while the fail addresses FADD<1:4> and alternative data (ALTD<1:4> in FIG. 5) are stored. When the match flag MF is activated during the read operation, the error correction circuit 109 might not execute the error decoding operation but may output transmission alternative data TALTD as the internal read data IRDD. When the match flag MF is activated during the write operation, the error correction circuit 109 might not execute the error decoding operation on the internal write data IWTD, but the error correction circuit 109 may apply the internal write data IWTD as the transmission alternative data TALTD to the data alternation control circuit 113. The error correction circuit 109 may include the write error correction circuit (WECC) 109_1 and a read error correction circuit (RECC) 109_3.

The write error correction circuit 109_1 may execute the error encoding operation based on the internal write data IWTD that is received from the data queue 107 during the write operation, executed under control of the scheduler 105. The error encoding operation that is executed by the write error correction circuit 109_1 may be executed through a method for generating a syndrome having information on an error bit by using an ECC (Error Correction Code). The write error correction circuit 109_1 may generate the syndrome from the internal write data IWTD as the result of the error encoding operation. The memory write data MWTD may include the syndrome and the internal write data IWTD. For example, the write error correction circuit 109_1 may receive the internal write data IWTD, composed of 64 bits, and may execute the error encoding operation to generate the 72-bit memory write data MWTD as the result of the error encoding operation, the 72-bit memory write data MWTD including the 8-bit syndrome and the 64-bit internal write data IWTD. The write error correction circuit 109_1 may apply the memory write data MWTD as the memory data MDATA to the memory device (35 of FIG. 16) through the memory interface 115. When the match flag MF is activated during the write operation, the write error correction circuit 109_1 might not execute the error decoding operation on the internal write data IWTD but may apply the internal write data IWTD as the transmission alternative data TALTD to the data alternation control circuit 113.

During the read operation, which is executed under control of the scheduler 105, the read error correction circuit 109_3 may execute the error decoding operation based on the memory read data MRDD that is received from the memory device (35 of FIG. 16) through the memory interface 115. The memory read data MRDD may include cell data (not illustrated) and cell syndrome (not illustrated), which are output from at least one memory cell, among memory cells (not illustrated) included in the memory device 35 of FIG. 16, accessed during the read operation. The error decoding operation that is executed by the read error correction circuit 109_3 may be executed through a method for determining whether an error is contained in the cell data, through an error decoding operation on the cell syndrome included in the memory read data MRDD. The read error correction circuit 109_3 may output, as the internal read data IRDD, cell data that is determined to contain no error according to the error decoding operation. For example, when it is determined that the 64-bit cell data and the 8-bit cell syndrome are contained in the memory read data MRDD and the cell data contains no error, the read error correction circuit 109_3 may output the 64-bit cell data as the internal read data IRDD. When it is determined through the error decoding operation that the cell data contains no error, the read error correction circuit 109_3 may correct the error of the cell data and may output the error-corrected cell data as the internal read data IRDD. In another example, when it is determined that the 64-bit cell data and the 8-bit cell syndrome are contained in the memory read data MRDD and the cell data contains an error, the read error correction circuit 109_3 may correct the error of the 64-bit cell data based on the cell syndrome and may output the error-corrected 64-bit cell data as the internal read data IRDD. The read error correction circuit 109_3 may apply the internal read data IRDD to the read data queue 107_3. The read error correction circuit 109_3 may generate the error flag EFLAG that is activated when it is determined that the cell data that is included in the memory read data MRDD contains an error or when the error of the cell data that is included in the memory read data MRDD is corrected. The read error correction circuit 109_3 may apply the error flag EFLAG to the data alternation control circuit 113. When the match flag MF is activated during the read operation, the read error correction circuit 109_3 might not execute the error decoding operation based on the memory read data MRDD but may output the transmission alternative data TALTD that is stored in the data alternation control circuit 113 as the internal read data IRDD.

The address generation circuit 111 may be coupled to the host interface 101, the data alternation control circuit 113, and the memory interface 115. During a data access operation, the address generation circuit 111 may receive an address ADD from the host interface 101 based on the host address HADD. The address generation circuit 111 may generate the internal address IADD for accessing a memory cell, when a read operation or write operation is executed based on the address ADD. The address generation circuit 111 may apply the internal address IADD to the data alternation control circuit 113 and the memory interface 115.

The data alternation control circuit 113 may be coupled to the command queue 103, the error correction circuit 109, the address generation circuit 111, and the memory interface 115. The data alternation control circuit 113 may receive the internal read command IRCMD and the internal write command IWCMD from the command queue 103, receive the error flag EFLAG and the internal read data IRDD from the error correction circuit 109, and receive the internal address IADD from the address generation circuit 111. The data alternation control circuit 113 may store, as one of the fail addresses (FADD<1:4> of FIG. 3), the internal address IADD that is generated to access a memory cell when the activated error flag EFLAG is received during the read operation and may store, as one of the alternative data (ALTD<1:4> of FIG. 5), the internal read data IRDD that is generated by correcting an error of the cell data that is included in the memory read data MRDD. In the present embodiment, the data alternation control circuit 113 may be implemented to store the internal read data IRDD as one of the alternative data ALTD<1:4>. In some embodiments, however, the data alternation control circuit 113 may be implemented to store the memory read data MRDD as one of the alternative data ALTD<1:4>. The data alternation control circuit 113 may generate the match flag MF that is activated when a data access operation is executed on a memory cell that is accessed by the internal address IADD that is equal to at least one of the fail addresses FADD<1:4>, while the fail addresses FADD<1:4> and the alternative data ALTD<1:4> are stored. The data alternation control circuit 113 may apply the transmission alternative data TALTD that is set to one of the alternative data ALTD<1:4> to the error correction circuit 109 when the match flag MF is activated during the read operation, and the error correction circuit 109 may output the transmission alternative data TALTD as the internal read data IRDD. The data alternation control circuit 113 may receive the internal write data IWTD as the transmission alternative data TALTD and may store the received data as one of the alternative data ALTD<1:4> when the match flag MF is activated during the write operation.

The memory interface 115 may control the transmission of the memory command MCMD, the memory data MDATA, and the memory address MADD between the memory controller 10 and the memory device (35 of FIG. 16).

The memory controller 10, configured in the above-described manner, may include the data alternation control circuit 113 that stores the fail addresses (FADD<1:4> of FIG. 3) and the alternative data (ALTD<1:4> of FIG. 5) when at least one memory cell that is accessed during the data access operation, including the read operation and the write operation, is determined to be a fail memory cell and may control the execution of the read operation and the write operation by using the transmission alternative data TALTD, thereby blocking an error that may occur when the fail memory cell is accessed. Furthermore, when the read operation is executed after the fail addresses FADD<1:4> and the alternative data ALTD<1:4> are stored in the data alternation control circuit 113, the memory controller 10 might not execute the error decoding operation but may generate the read data RDATA to be transmitted to the host based on the transmission alternative data TALTD, and thus may block an error that is caused by the fail memory cell, even when an error cannot be corrected by the error decoding operation. Furthermore, the memory controller 10 may control the execution of the data access operation by using the transmission alternative data TALTD and may block an error that may occur when a fail memory cell is accessed, thereby preventing the degradation in performance of the memory system.

Figure 2:
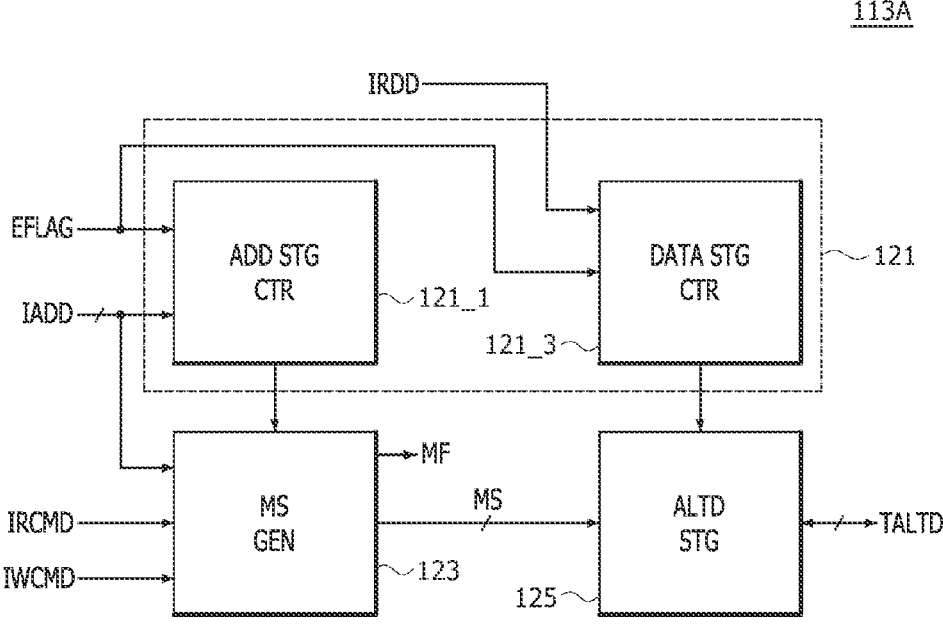
FIG. 2 is a block diagram illustrating the configuration of a data alternation control circuit in accordance with an embodiment.

FIG. 2 is a block diagram illustrating the configuration of a data alternation control circuit 113A in accordance with an embodiment. As illustrated in FIG. 2, the data alternation control circuit 113A may include a storage control circuit 121, a match signal generation circuit (MS GEN) 123, and an alternative data storage circuit (ALTD STG) 125.

The storage control circuit 121 may control the match signal generation circuit 123 to store the internal address IADD as one of the fail addresses (FADD<1:4> of FIG. 3) based on the error flag EFLAG and may control the alternative data storage circuit 125 to store the internal read data IRDD as one of the alternative data (ALTD<1:4>). The storage control circuit 121 may include an address storage control circuit (ADD STG CTR) 121_1 and a data storage control circuit (DATA STG CTR) 121_3.

The address storage control circuit 121_1 may control the match signal generation circuit 123 to store the internal address IADD as one of the fail addresses (FADD<1:4> of FIG. 3) when the error flag EFLAG is activated during a read operation. More specifically, when the internal address IADD is not matched with any one of the previously stored fail addresses FADD<1:4> in the case in which the error flag EFLAG is activated during the read operation, the address storage control circuit 121_1 may control the match signal generation circuit 123 to store the internal address IADD as one of the fail addresses FADD<1:4>. For example, when the error flag EFLAG is activated during the read operation which is executed while the fail addresses FADD<1:4> are not stored in the match signal generation circuit 123, the address storage control circuit 121_1 may control the match signal generation circuit 123 to store the internal address IADD as the fail address FADD<1>. In another example, when the error flag EFLAG is activated during the read operation that is executed while the fail address FADD<1> is stored in the match signal generation circuit 123 and the internal address IADD is not matched with the fail address FADD<1>, the address storage control circuit 121_1 may control the match signal generation circuit 123 to store the internal address IADD as the fail address FADD<2>.

The data storage control circuit 121_3 may control the alternative data storage circuit 125 to store the internal read data IRDD as one of the alternative data (ALTD<1:4> of FIG. 5) when the error flag EFLAG is activated during the read operation. When the internal address IADD is not matched with the previously stored fail addresses (FADD<1:4> of FIG. 3) in the case in which the error flag EFLAG is activated during the read operation, the data storage control circuit 121_3 may control the alternative data storage circuit 125 to store the internal read data IRDD as one of the alternative data ALTD<1:4>. For example, when the error flag EFLAG is activated during the read operation that is executed while the alternative data ALTD<1:4> is not stored in the alternative data storage circuit 125, the data storage control circuit 121_3 may control the alternative data storage circuit 125 to store the internal read data IRDD as the alternative data ALTD<1>. In another example, when the error flag EFLAG is activated during the read operation that is executed while the alternative data ALTD<1> is stored in the alternative data storage circuit 125, the data storage control circuit 121_3 may control the alternative data storage circuit 125 to store the internal read data IRDD as the alternative data ALTD<2>.

The match signal generation circuit 123 may store the fail addresses (FADD<1:4> of FIG. 3) or may generate the match flag MF and a match signal MS based on the internal address IADD, the internal read command IRCMD, and the internal write command IWCMD. When the error flag EFLAG is activated during the read operation and the internal address IADD is not matched with any one of the fail addresses FADD<1:4>, the match signal generation circuit 123 may store the internal address IADD as one of the fail addresses FADD<1:4> under control of the address storage control circuit 121_1. The match signal generation circuit 123 may generate the match flag MF that is activated when a data access operation is executed on at least one memory cell that is accessed by the internal address IADD that is matched with one of the fail addresses FADD<1:4>. The match signal generation circuit 123 may generate the match flag MF that is deactivated when the data access operation is executed on at least one memory cell that is accessed by the internal address IADD that is not matched with the fail addresses FADD<1:4>. When the match flag MF is activated, the match signal generation circuit 123 may generate the match signal MS having a logic bit set, corresponding to one fail address, among the fail addresses FADD<1:4>, equal to the internal address IADD. For example, the match signal generation circuit 123 may generate the match signal MS having a logic bit set '00' when the internal address IADD is matched with the fail address (FADD<1> of FIG. 3) in the case in which the read operation or write operation is executed and may generate the match signal MS having a logic bit set '01' when the internal address IADD is matched with the fail address (FADD<2> of FIG. 3).

The alternative data storage circuit 125 may store the internal read data IRDD as one of the alternative data (ALTD<1:4> of FIG. 5) based on the match signal MS and may set one of the alternative data ALTD<1:4> to the transmission alternative data TALTD. When the error flag EFLAG is activated during the read operation, the alternative data storage circuit 125 may store the internal read data IRDD in one of the alternative data ALTD<1:4> according to the match signal MS. At this time, one of the alternative data ALTD<1:4> in which the internal read data IRDD is stored may correspond to one of the fail addresses (FADD<1:4> of FIG. 3) in which the internal address IADD is stored. When a read operation is executed on a memory cell that is accessed by the internal address IADD that is equal to one of the fail addresses FADD<1:4>, the alternative data storage circuit 125 may output one of the alternative data ALTD<1:4>, corresponding to one fail address, among the fail addresses FADD<1:4>, equal to the internal address IADD, as the transmission alternative data TALTD. When a write operation is executed on a memory cell that is accessed by the internal address IADD that is equal to one of the fail addresses FADD<1:4>, the alternative data storage circuit 125 may store the transmission alternative data TALTD, generated from the internal write data IWTD as one of the alternative data ALTD<1:4>, corresponding to one fail address, among the fail addresses FADD<1:4>, equal to the internal address IADD. The alternative data storage circuit 125 may be implemented as an SRAM to store the alternative data ALTD<1:4>.

Figure 3:
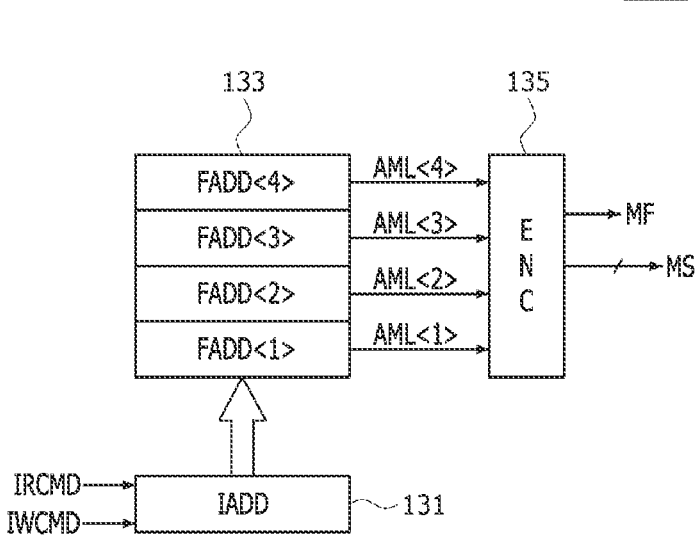
FIG. 3 is a block diagram illustrating the configuration of a match signal generation circuit in accordance with an embodiment.

FIG. 3 is a block diagram illustrating the configuration of a match signal generation circuit 123A in accordance with an embodiment. As illustrated in FIG. 3, the match signal generation circuit 123A may include an internal address receiving circuit 131, a fail address storage circuit 133, and a match encoder (ENC) 135.

The internal address receiving circuit 131 may receive the internal address IADD based on the internal read command IRCMD and the internal write command IWCMD, and store the received internal address IADD. The internal address receiving circuit 131 may receive and store the internal address IADD when the data access operation is executed or when the read operation is executed according to the internal read command IRCMD or the write operation is executed according to the internal write command IWCMD. The internal address receiving circuit 131 may be coupled to the fail address storage circuit 133 and may apply the internal address IADD, stored in the internal address receiving circuit 131, to the fail address storage circuit 133.

The fail address storage circuit 133 may receive the internal address IADD from the internal address receiving circuit 131. When the error flag EFLAG is activated during the read operation, the fail address storage circuit 133 may store the internal address IADD as one of the fail addresses FADD<1:4>. More specifically, the fail address storage circuit 133 may store the internal address IADD as the fail address FADD<1> when the error flag EFLAG is activated for the first time during the read operation, store the internal address IADD as the fail address FADD<2> when the error flag EFLAG is activated for the second time during the read operation, store the internal address IADD as the fail address FADD<3> when the error flag EFLAG is activated for the third time during the read operation, and store the internal address IADD as the fail address FADD<4> when the error flag EFLAG is activated for the fourth time during the read operation. When the storage space of the fail address storage circuit 133 is full of the fail addresses FADD<1:4>, the fail address storage circuit 133 may stop the operation of storing the internal address IADD. In some embodiments, the fail address storage circuit 133 may be implemented to delete the fail address FADD<1> that is stored for the first time and may store the internal address IADD as a new fail address. When the data access operation is executed, the fail address storage circuit 133 may generate address match signals AML<1:4> by comparing the internal address IADD to the fail addresses FADD<1:4>. For example, when the internal address IADD is equal to the fail address FADD<1> during the data access operation, the fail address storage circuit 133 may generate the activated address match signal AML<1> and the deactivated address match signals AML<2:4>. In another example, when the internal address IADD is equal to the fail address FADD<3> during the data access operation, the fail address storage circuit 133 may generate the activated address match signal AML<3> and the deactivated address match signals AML<1:2> and AML<4>. In yet another example, when the internal address IADD is different from the fail addresses FADD<1:4> during the data access operation, the fail address storage circuit 133 may generate the deactivated address match signals AML<1:4>. The fail address storage circuit 133 may be coupled to the match encoder 135 and may apply the address match signals AML<1:4> to the match encoder 135. In the present embodiment, it has been described that the fail addresses FADD<1:4> and the address match signals AML<1:4> are each implemented as four bits. In some embodiments, the fail addresses FADD<1:4> and the address match signals AML<1:4> may each be implemented as a different number of bits.

The match encoder 135 may receive the address match signals AML<1:4> from the fail address storage circuit 133. The match encoder 135 may generate the match flag MF and the match signal MS based on the address match signals AML<1:4>. During the data access operation, the match encoder 135 may generate the activated match flag MF when the internal address IADD is matched with one of the fail addresses FADD<1:4> and may generate the deactivated match flag MF when the internal address IADD is different from the fail address FADD<1:4>. The match encoder 135 may generate the match signal MS by encoding the address match signals AML<1:4>. For example, when only the address match signal AML<1> of the address match signals AML<1:4> is activated, the match encoder 135 may generate the match signal MS that is set to a binary logic bit set '00'. In another example, when only the address match signal AML<3> of the address match signals AML<1:4> is activated, the match encoder 135 may generate the match signal MS that is set to a binary logic bit set '10'. In the present embodiment, it has been described that the match signal MS is implemented as a 2-bit binary logic bit set. In some embodiments, the match signal MS may be implemented as a binary logic bit set that is composed of a different number of bits.

FIG. 4 is a table for describing the operation of the match signal generation circuit 123A. FIG. 4 shows information on whether the match flag MF is activated, the address match signals AML<1:4>, and the logic bit sets of the match signal MS, the match flag MF being generated according to the comparison results between the internal address IADD and the fail addresses FADD<1:4> during the data access operation, while the fail addresses FADD<1:4> are stored. When the internal address IADD is equal to the fail address FADD<1> during the data access operation as shown in a second row of FIG. 4, the address match signal AML<1> may be activated, the match flag MF may be activated to a logic high level '1', and the match signal MS may be set to a binary logic bit set '00'. When the internal address IADD is equal to the fail address FADD<2> during the data access operation as shown in a third row of FIG. 4, the address match signal AML<2> may be activated, the match flag MF may be activated to a logic high level '1', and the match signal MS may be set to a binary logic bit set '01'. When the internal address IADD is equal to the fail address FADD<3> during the data access operation as shown in a fourth row of FIG. 4, the address match signal AML<3> may be activated, the match flag MF may be activated to a logic high level '1', and the match signal MS may be set to a binary logic bit set '10'. When the internal address IADD is equal to the fail address FADD<4> during the data access operation as shown in a fifth row of FIG. 4, the address match signal AML<4> may be activated, the match flag MF may be activated to a logic high level '1', and the match signal MS may be set to a binary logic bit set '11'. When the internal address IADD is different from the fail addresses FADD<1:4> during the data access operation as shown in a sixth row of FIG. 4, the address match signals AML<1:4> may be deactivated, and the match flag MF may be deactivated to a logic low level '0'.

Figure 5:
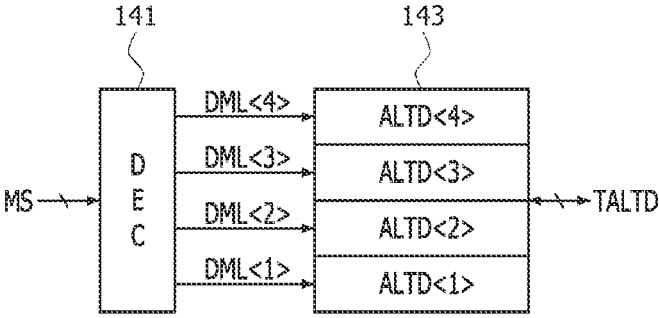
FIG. 5 is a block diagram illustrating the configuration of an alternative data generation circuit in accordance with an embodiment.

FIG. 5 is a block diagram illustrating the configuration of an alternative data generation circuit 125A in accordance with an embodiment. As illustrated in FIG. 5, the alternative data generation circuit 125A may include a match decoder (DEC) 141 and an alternative data storage circuit 143.

The match decoder 141 may receive the match signal MS that is generated by the match encoder 135. The match decoder 141 may generate data match signals DML<1:4> by decoding the match signal MS. The match decoder 141 may activate one of the data match signals DML<1:4> based on the logic bit set of the match signal MS. For example, when the internal address IADD is equal to the fail address FADD<1> during the data access operation such that the logic bit set of the match signal MS is set to a binary logic bit set '00', the match decoder 141 may activate the data match signal DML<1> of the data match signals DML<1:4>. In another example, when the internal address IADD is equal to the fail address FADD<3> during the data access operation such that the logic bit set of the match signal MS is set to a binary logic bit set '10', the match decoder 141 may activate the data match signal DML<3> of the data match signals DML<1:4>. The match decoder 141 may be coupled to the alternative data storage circuit 143 and may apply the data match signals DML<1:4> to the alternative data storage circuit 143.

The alternative data storage circuit 143 may store the internal read data IRDD as one of the alternative data ALTD<1:4> when the error flag EFLAG is activated during the read operation. For example, when the error flag EFLAG is activated during the read operation such that the fail address storage circuit 133 stores the internal address IADD as the fail address FADD<1>, the alternative data storage circuit 143 may store the internal read data IRDD as the alternative data ALTD<1>. In another example, when the error flag EFLAG is activated during the read operation such that the fail address storage circuit 133 stores the internal address IADD as the fail address FADD<3>, the alternative data storage circuit 143 may store the internal read data IRDD as the alternative data ALTD<3>. The alternative data storage circuit 143 may receive the data match signals DML<1:4> from the match decoder 141. During the read operation, the alternative data storage circuit 143 may apply one of the alternative data ALTD<1:4> as the transmission alternative data TALTD to the error correction circuit 109 based on the data match signals DML<1:4>. During the write operation, the alternative data storage circuit 143 may store the transmission alternative data TALTD that is generated from the internal write data IWTD in one of the alternative data ALTD<1:4> based on the data match signals DML<1:4>.

FIG. 6 is a table for describing the operation of the alternative data generation circuit 125A. FIG. 6 shows whether the data match signals DML<1:4> are activated and the alternative data ALTD<1:4> are input/output, according to the logic bit set of the match signal MS, during the data access operation, while the alternative data ALTD<1:4> are stored. When the internal address IADD is equal to the fail address FADD<1> during the data access operation such that the match signal MS is set to a binary logic bit set '00' as shown in a second row of FIG. 6, the data match signal DML<1> of the data match signals DML<1:4> may be activated, the alternative data ALTD<1> of the alternative data ALTD<1:4> may be applied to the error correction circuit 109 during the read operation, and the transmission alternative data TALTD may be stored as the alternative data ALTD<1> during the write operation. When the internal address IADD is equal to the fail address FADD<2> during the data access operation such that the match signal MS is set to a binary logic bit set '01' as shown in a third row of FIG. 6, the data match signal DML<2> of the data match signals DML<1:4> may be activated, the alternative data ALTD<2> of the alternative data ALTD<1:4> may be applied to the error correction circuit 109 during the read operation, and the transmission alternative data TALTD may be stored as the alternative data ALTD<2> during the write operation. When the internal address IADD is equal to the fail address FADD<3> during the data access operation such that the match signal MS is set to a binary logic bit set '10' as shown in a fourth row of FIG. 6, the data match signal DML<3> of the data match signals DML<1:4> may be activated, the alternative data ALTD<3> of the alternative data ALTD<1:4> may be applied to the error correction circuit 109 during the read operation, and the transmission alternative data TALTD may be stored as the alternative data ALTD<3> during the write operation. When the internal address IADD is equal to the fail address FADD<4> during the data access operation such that the match signal MS is set to a binary logic bit set '11' as shown in a fifth row of FIG. 6, the data match signal DML<4> of the data match signals DML<1:4> may be activated, the alternative data ALTD<4> of the alternative data ALTD<1:4> may be applied to the error correction circuit 109 during the read operation, and the transmission alternative data TALTD may be stored as the alternative data ALTD<4> during the write operation.

Figure 7:
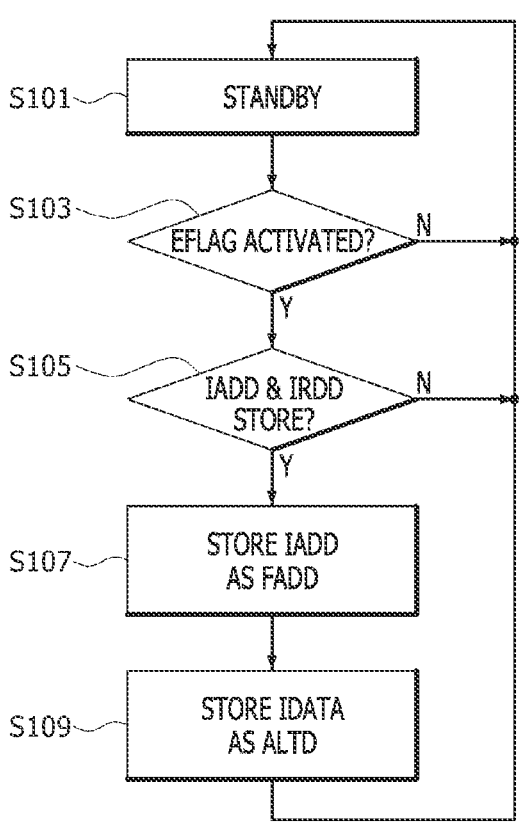
FIG. 7 is a flowchart illustrating an operation of a storage control circuit in accordance with an embodiment.

FIG. 7 is a flowchart for describing an operation of the storage control circuit 121. Referring to FIG. 7A, an operation in which the internal address IADD and the internal read data IRDD are stored by the storage control circuit 121 when the error flag EFLAG is activated during the read operation will be described as follows. In step S101, during the read operation, the storage control circuit 121 may retain a standby state until the error flag EFLAG is activated. In step S103, during the read operation, the storage control circuit 121 may determine whether the error flag EFLAG is activated. When the error flag EFLAG is not activated during the read operation ('N'), the storage control circuit 121 may retain the standby state in step S101. In step S105, when the error flag EFLAG is activated during the read operation ('Y'), the storage control circuit 121 may determine whether the internal address IADD and the internal read data IRDD can be stored. When it is determined that the internal address IADD and the internal read data IRDD cannot be stored ('N'), the storage control circuit 121 may return to the standby state of step S101. When it is determined that the internal address IADD and the internal read data IRDD can be stored ('Y'), the storage control circuit 121 may store the internal address IADD as a fail address in step S107 and may store the internal read data IRDD as the alternative data ALTD in step S109.

Figure 8:
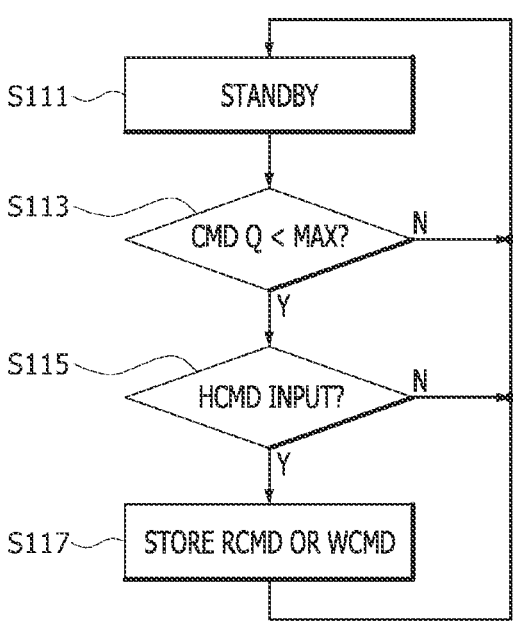
FIG. 8 is a flowchart illustrating an operation of a command queue in accordance with an embodiment.

FIG. 8 is a flowchart for describing an operation of the command queue 103. As illustrated in FIG. 8, in step S111, the command queue 103 may receive the host command HCMD and may retain a standby state until the command queue 103 has a remaining storage space that is capable of storing the host command HCMD. In step S113, the command queue 103 may determine whether the command queue 103 has a remaining storage space that is capable of storing the host command HCMD. When the storage space of the command queue 103 is full ('N'), the command queue 103 might not receive the host command HCMD and may retain the standby state in step S111. In step S115, when the command queue 103 has a remaining storage space that is capable of storing the host command HCMD ('Y'), the command queue 103 may determine whether the host command HCMD is received. When the host command HCMD is not received ('N'), the command queue 103 may retain the standby state in step S111. In step S117, when the host command HCMD is received ('Y'), the command queue 103 may store the read command RCMD or the write command WCMD included in the host command HCMD.

Figure 9:
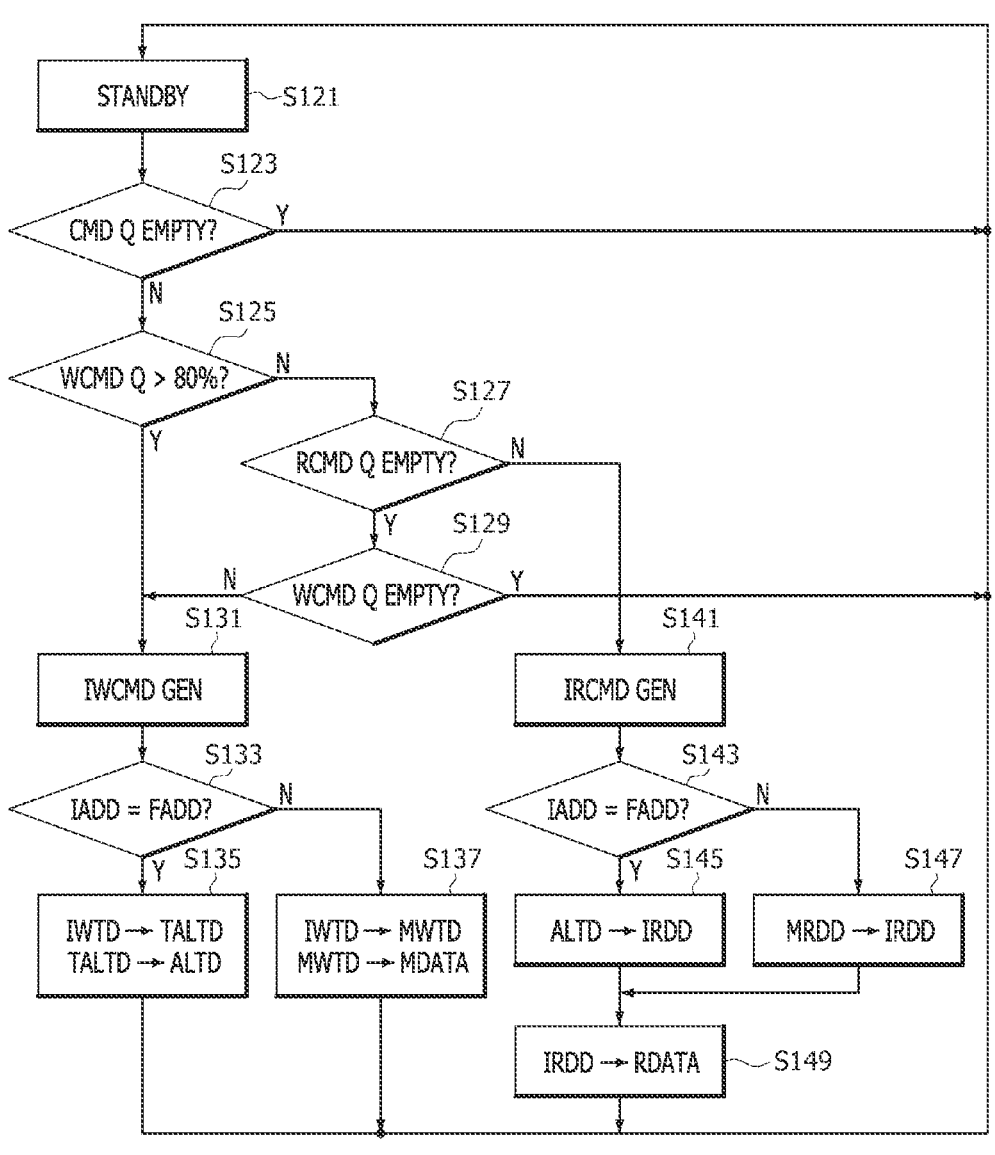
FIG. 9 is a flowchart illustrating a data access operation that is executed by a memory controller in accordance with an embodiment.

FIG. 9 is a flowchart for describing the data access operation that is executed by the memory controller 10. Referring to FIG. 9, the operation in which the memory controller 10 generates a command and data applied to the memory device during the write operation and the operation in which the memory controller 10 generates a command and data applied to the host during the read operation will be described as follows.

In step S121, the memory controller 10 may retain a standby state until the read command RCMD or the write command WCMD that is extracted from the host command HCMD is stored in the command queue 103. In step S123, the memory controller 10 may determine whether the read command RCMD or the write command WCMD that is extracted from the host command HCMD is stored in the command queue 103. When the command queue 103 is empty while the read command RCMD or the write command WCMD is not stored in the command queue 103 ('Y'), the memory controller 10 may retain the standby state in step S121. When the read command RCMD or the write command WCMD is stored in the command queue 103 ('N'), the memory controller 10 may execute one of the write operation and the read operation. The memory controller 10 may execute the read operation in preference to the write operation. However, when the write command queue 103_3 uses more than 80% of the storage space to store the write command WCMD for the write operation, the memory controller 10 may execute the write operation in preference to the read operation. In some embodiments, the ratio may be set to various values. For this operation, in step S125, the memory controller 10 may determine whether the storage space of the write command queue 103_3 is used by more than 80%. In step S131, when the storage space of the write command queue 103_3 is used by more than 80% ('Y'), the internal write command IWCMD may be generated for the write operation. In step S135, when the internal address IADD is matched with a fail address during the write operation ('Y'), the memory controller 10 may generate the transmission alternative data TALTD from the internal write data IWTD and may store the transmission alternative data TALTD as the alternative data ALTD in the alternative data generation circuit 125. When the internal address IADD is not matched with the fail address ('N'), in step S137, the memory write data MWTD may be generated from the internal write data IWTD, and the memory write data MWTD may be transmitted as the memory data MDATA to the memory device (35 of FIG. 16). When the determination result of step S125 indicates that the storage space of the write command queue 103_3 is used by less than 80% ('N'), the memory controller 10 may determine whether the storage space of the read command queue 103_1 is empty in step S127 and may determine whether the storage space of the write command queue 103_3 is empty in step S129. In steps S131, S133, S135, and S137, when the determination result of step S127 indicates that the storage space of the read command queue 103_1 is empty ('Y') and the determination result of step S129 indicates that the storage space of the write command queue 103_3 is not empty ('N'), the above-described write operation may be executed. In step S141, when the determination result of step S127 indicates that the storage space of the read command queue 103_1 is not empty ('N'), the internal read command IRCMD may be generated for the read operation. In step S145, when the internal address IADD is matched with the fail address during the read operation ('Y'), the internal read data IRDD may be generated from the transmission alternative data TALTD that is generated from the alternative data ALTD stored in the alternative data generation circuit 125. In step S147, when the internal address IADD is not matched with the fail address during the read operation ('N'), the internal read data IRDD may be generated from the memory read data MRDD. In step S149, the internal read data IRDD may be stored in the read data queue 107_3, and then output as the read data RDATA and transferred to the host (31 of FIG. 16).

Figure 10:
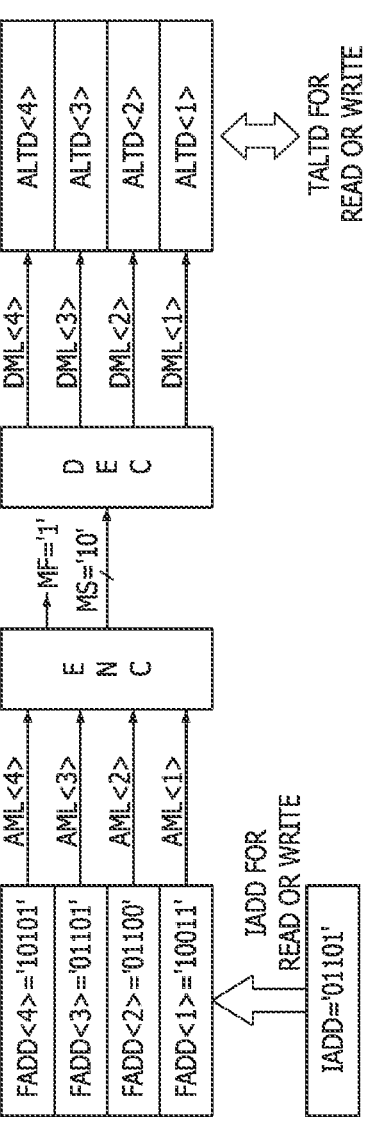
FIG. 10 is a block diagram for describing an operation of the data alternation control circuit in accordance with an embodiment.

FIG. 10 is a block diagram for describing an operation of the data alternation control circuit 113. The data access operation, which is executed by the internal address IADD that is set to a binary logic bit set '01101' while the fail address FADD<1> is stored as a binary logic bit set '10011', the fail address FADD<2> is stored as a binary logic bit set '01100', the fail address FADD<3> is stored as a binary logic bit set '01101', and the fail address FADD<4> is stored as a binary logic bit set '10101' will be described as follows with reference to FIG. 10.

Because the address match signal AML<3> of the address match signals AML<1:4> is activated when the write operation is executed by the internal address IADD having the same logic bit set as the fail address FADD<3>, the match flag MF may be activated to a logic high level '1', and the match signal MS may be set to a binary logic bit set '10'. Because the data match signal DML<3> of the data match signals DML<1:4> is activated by the match signal MS that is set to a binary logic bit set '10', the transmission alternative data TALTD that is generated from the internal write data IWTD may be stored as the alternative data ALTD<3>.

Furthermore, because the address match signal AML<3> of the address match signals AML<1:4> is activated when the read operation is executed by the internal address IADD having the same logic bit set as the fail address FADD<3>, the match flag MF may be activated to a logic high level '1', and the match signal MS may be set to a binary logic bit set '10'. Because the data match signal DML<3> of the data match signals DML<1:4> is activated by the match signal MS that is set to a binary logic bit set '10', the alternative data ALTD<3> may be output as the transmission alternative data TALTD.

Figure 11:
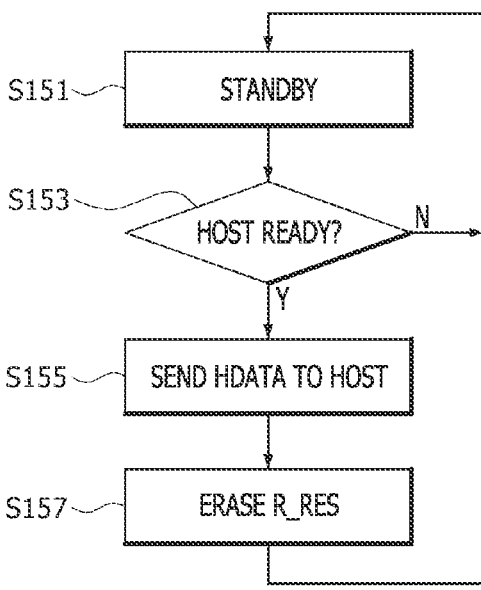
FIG. 11 is a flowchart illustrating an operation that is executed when a read operation is ended.

FIG. 11 is a flowchart for describing an operation that is executed when the read operation is ended. As illustrated in FIG. 11, in step S153, the memory controller 10 may determine whether the host (31 of FIG. 16) is ready to receive the internal read data IRDD after the read operation is executed to store the internal read data IRDD in the read data queue 107_3. In step S151, the memory controller 10 may retain the standby state when the host 31 is not ready to receive the internal read data IRDD ('N'). When the host 31 is ready to receive the internal read data IRDD ('Y'), the read data queue 107_3 may transmit the internal read data IRDD as the host data HDATA to the host 31 in step S155, and the read response queue 103_5 may delete/erase the read response command R_RES in step S157 because the read operation has been ended.

Figure 12:
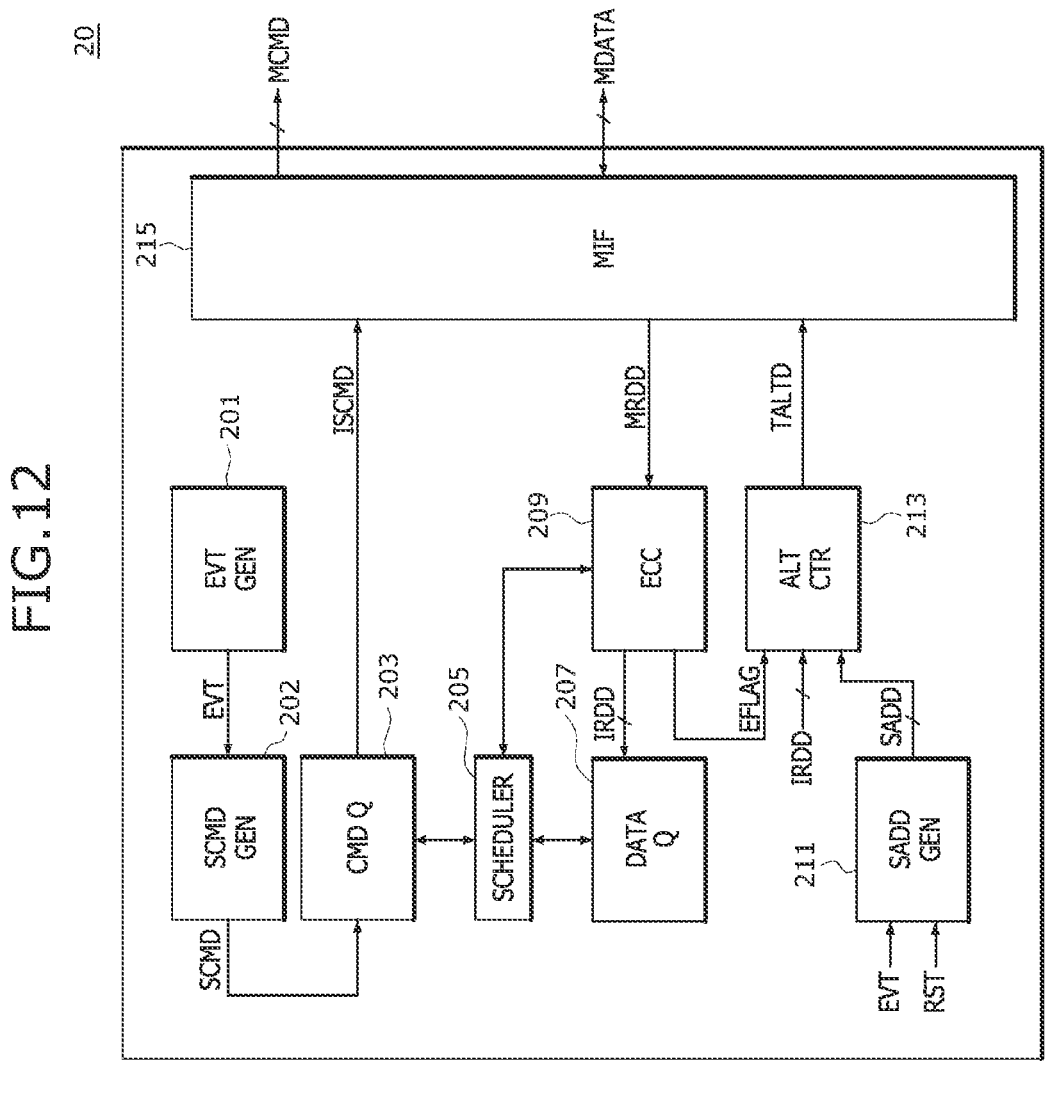
FIG. 12 is a block diagram illustrating the configuration of a memory controller in accordance with another embodiment.

FIG. 12 is a block diagram illustrating the configuration of a memory controller 20 in accordance with another embodiment. As illustrated in FIG. 12, the memory controller 20 may include an event signal generation circuit (EVT GEN) 201, a self command generation circuit (SCMD GEN) 202, a command queue (CMD Q) 203, a scheduler 205, a data queue (DATA Q) 207, an error correction circuit (ECC) 209, a self address generation circuit (SADD GEN) 211, a data alternation control circuit (ALT CTR) 213, and a memory interface (MIF) 215.

The event signal generation circuit 201 may generate an event signal EVT that is activated in each event interval. The event interval may be set to various values in different embodiments. The event signal generation circuit 201 may be coupled to the self command generation circuit 202 and the self address generation circuit 211 and may apply the event signal EVT to the self command generation circuit 202 and the self address generation circuit 211.

The self command generation circuit 202 may receive the event signal EVT from the event signal generation circuit 201. The self command generation circuit 202 may generate a self command SCMD for a self read operation whenever the event signal EVT is activated. The self command SCMD may include an identification bit so as to be distinguished from a command that is applied from the host (31 of FIG. 16). For example, the self command SCMD may include an identification bit that is set to a logic high level '1', and the command applied from the host 31 may include an identification bit that is set to a logic low level '0'. The self command generation circuit 202 may be coupled to the command queue 203 and may apply the self command SCMD to the command queue 203.

The command queue 203 may store the self command SCMD from the self command generation circuit 202. The command queue 203 may apply relevant information to the scheduler 205 when the self command SCMD is stored. The command queue 203 may be controlled by the scheduler 205 and may generate an internal self command ISCMD for the self read operation according to the stored self command SCMD. The command queue 203 may apply the internal self command ISCMD as the memory command MCMD to the memory device (35 of FIG. 16) through the memory interface 215.

The scheduler 205 may store relevant information when the self command SCMD is stored in the command queue 203. The scheduler 205 may control the command queue 203 to generate and output the internal self command ISCMD based on the self command SCMD. The scheduler 205 may control the error correction circuit 209 to generate the internal read data IRDD and the error flag EFLAG by executing the error decoding operation based on the memory read data MRDD during a self read operation. The scheduler 205 may control the data queue 207 to store the internal read data IRDD.

The error correction circuit 209 may be coupled to the scheduler 205, the data queue 207, the data alternation control circuit 213, and the memory interface 215. The error correction circuit 209 may be controlled by the scheduler 205 and may generate the error flag EFLAG and the internal read data IRDD by executing the error decoding operation based on the memory read data MRDD that is received from the memory interface 215 during the self read operation. The error correction circuit 209 may apply the error flag EFLAG to the data alternation control circuit 213.

The self address generation circuit 211 may receive the event signal EVT from the event signal generation circuit 201. The self address generation circuit 211 may generate a self address SADD based on a reset signal RST and the event signal EVT. The self address generation circuit 211 may initialize the self address SADD when the activated reset signal RST is received for a reset operation. The self address generation circuit 211 may generate the self address SADD for the self read operation whenever the event signal EVT is activated.

Figure 13:
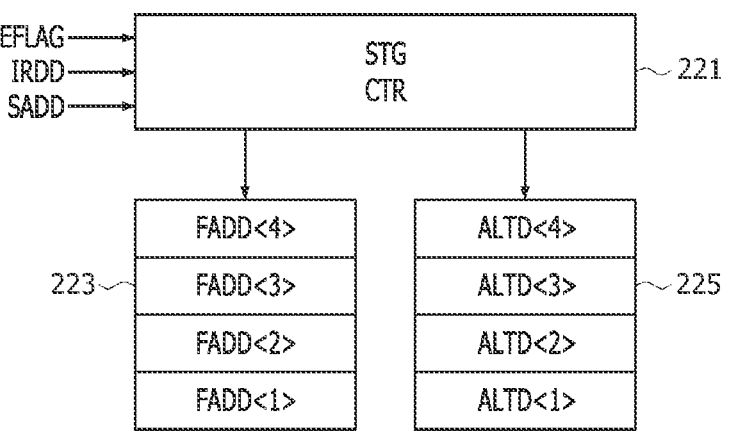
FIG. 13 is a block diagram illustrating the configuration of a data alternation control circuit in accordance with another embodiment.

The data alternation control circuit 213 may store the self address SADD as one of fail addresses (FADD<1:4> of FIG. 13), the self address SADD being generated to access a memory cell when the activated error flag EFLAG is received during the self read operation and may store the internal read data IRDD as one of alternative data (ALTD<1: 4> of FIG. 13). In the present embodiment, the data alternation control circuit 213 may be implemented to store the internal read data IRDD as one of the alternative data ALTD<1:4>. However, in some embodiments, the data alternation control circuit 213 may be implemented to store the memory read data MRDD as one of the alternative data ALTD<1:4>. The data alternation control circuit 213 may output one of the alternative data ALTD<1:4> as the transmission alternative data TALTD and may apply the internal read data IRDD as the memory data MDATA to the memory device (35 of FIG. 16) through the memory interface 215.

The memory interface 215 may control the transmission of the memory command MCMD and the memory data MDATA between the memory controller 20 and the memory device (35 of FIG. 16).

The memory controller 20, configured in the above-described manner, may execute the self read operation in each event interval and may store the fail addresses (FADD<1:4> of FIG. 13) and the alternative data (ALTD<1: 4> of FIG. 13) in the data alternation control circuit 213, when at least one memory cell that is accessed by the self read operation is determined to be a fail memory cell. Because the memory controller 20 can execute the data access operation by using the fail addresses FADD<1:4> and the alternative data ALTD<1:4> that are stored in the data alternation control circuit 213, the memory controller 20 may block an error that may occur when a fail memory cell is accessed and may prevent the degradation of the memory system. Because the data access operation that the memory controller 20 executes by using the fail addresses FADD<1: 4> and the alternative data ALTD<1:4> may be executed in the same manner as the data access operation that is executed by the memory controller 10 as described above with reference to FIGS. 1 to 11, the detailed description of the data access operation will be omitted herein.

FIG. 13 is a block diagram illustrating the configuration of a data alternation control circuit 213A in accordance with another embodiment. As illustrated in FIG. 13, the data alternation control circuit 213A may include a storage control circuit (STG CTR) 221, a match signal generation circuit 223, and an alternative data storage circuit 225.

The storage control circuit 221 may control the match signal generation circuit 223 to store the self address SADD as one of the fail addresses FADD<1:4> based on the error flag EFLAG and may control the alternative data storage circuit 225 to store the internal read data IRDD as one of the alternative data (ALTD<1:4>). When the self address SADD is not matched with any one of the previously stored fail addresses FADD<1:4> in the case in which the error flag EFLAG is activated during the self read operation, the storage control circuit 221 may control the match signal generation circuit 223 to store the self address SADD as one of the fail addresses FADD<1:4>. When the self address SADD is not matched with any one of the previously stored fail addresses FADD<1:4> in the case in which the error flag EFLAG is activated during the self read operation, the storage control circuit 221 may control the alternative data storage circuit 225 to store the internal read data IRDD as one of the alternative data ALTD<1:4>.

Figure 14:
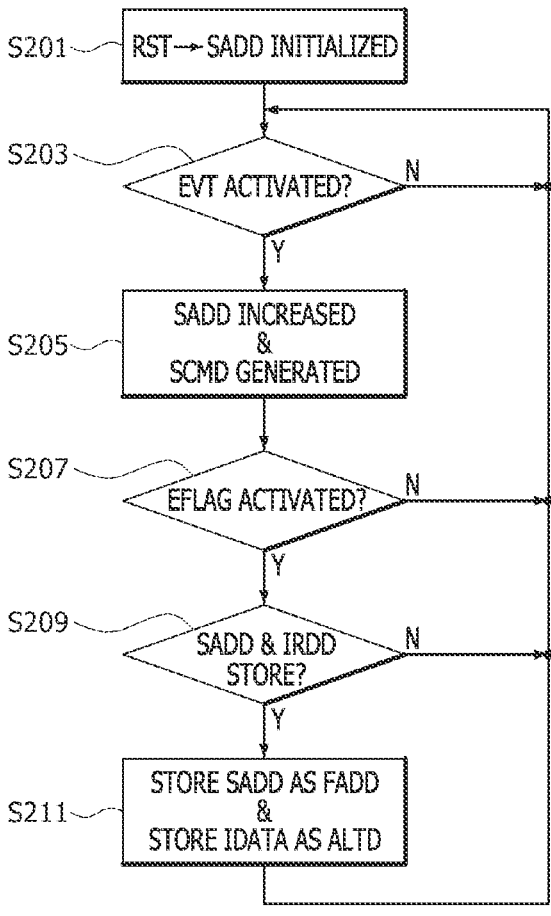
FIGS. 14 and 15 are flowcharts illustrating a self read operation of a memory controller in accordance with another embodiment.
Figure 15:
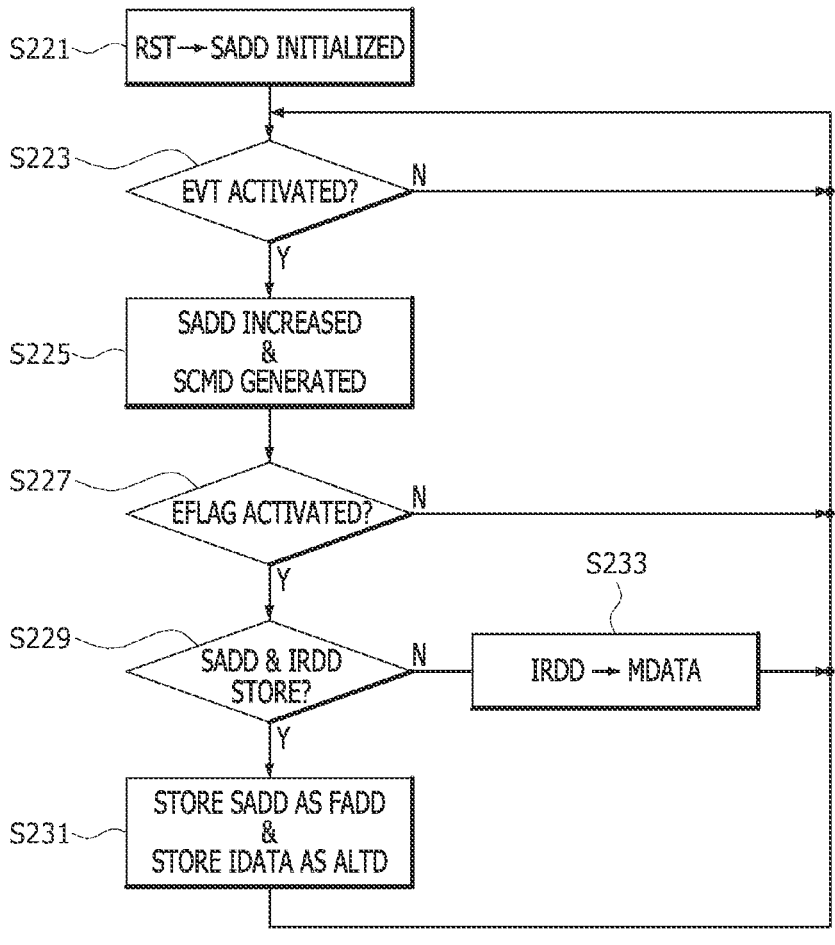

FIGS. 14 and 15 are flowcharts illustrating the self read operation that is executed by the memory controller 20.

Referring to FIG. 14, an example of the self read operation will be described as follows. In step S201, when the reset signal RST is activated for a reset operation, the memory controller 20 may initialize the self address SADD. In step S203, the memory controller 20 may determine whether the event signal EVT is activated. In step S205, when the event signal EVT is activated in each event interval ('Y'), the memory controller 20 may sequentially increase the logic bit set of the self address SADD such that the memory cells that are included in the memory device (35 of FIG. 16) are sequentially accessed and may generate the self command SCMD for the self read operation. In step S207, the memory controller 20 may determine whether the error flag EFLAG is activated during the self read operation. The error flag EFLAG may be activated when at least one memory cell that is accessed during the self read operation is a fail memory cell or an error of data that is output from at least one memory cell that is accessed during the self read operation is corrected. In step S203, when the error flag EFLAG is not activated during the self read operation ('N'), the memory controller 20 may determine again whether the event signal EVT is activated. In step S209, when the error flag EFLAG is activated during the self read operation ('Y'), the memory controller 20 may determine whether the self address SADD and the internal read data IRDD can be stored. In step S203, when it is determined that the self address SADD and the internal read data IRDD cannot be stored ('N'), the memory controller 20 may determine again whether the event signal EVT is activated. In step S211, when it is determined that the self address SADD and the internal read data IRDD can be stored ('Y'), the memory controller 20 may store the self address SADD as a fail address, and store the internal read data IRDD as the alternative data ALTD.

Referring to FIG. 15, another example of the self read operation will be described as follows. In step S221, when the reset signal RST is activated for the reset operation, the memory controller 20 may initialize the self address SADD. In step S223, the memory controller 20 may determine whether the event signal EVT is activated. In step S225, when the event signal EVT is activated in each event interval ('Y'), the memory controller 20 may sequentially increase the logic bit set of the self address SADD such that the memory cells that are included in the memory device (35 of FIG. 16) are sequentially accessed and may generate the self command SCMD for the self read operation. In step S227, the memory controller 20 may determine whether the error flag EFLAG is activated during the self read operation. The error flag EFLAG may be activated when at least one memory cell that is accessed during the self read operation is a fail memory cell or an error of data that is output from at least one memory cell that is accessed during the self read operation is corrected. In step S223, when the error flag EFLAG is not activated during the self read operation ('N'), the memory controller 20 may determine again whether the event signal EVT is activated. In step S229, when the error flag EFLAG is activated during the self read operation ('Y'), the memory controller 20 may determine whether the self address SADD and the internal read data IRDD can be stored. In step S233, when it is determined that the self address SADD and the internal read data IRDD cannot be stored ('N'), the memory controller 20 may apply the internal read data IRDD as the memory data MDATA to the memory device (35 of FIG. 16) through the memory interface 215. When it is determined that the self address SADD and the internal read data IRDD can be stored ('Y'), the memory controller 20 may store the self address SADD as a fail address and may store the internal read data IRDD as the alternative data ALTD, in step S231.

FIG. 16 is a block diagram illustrating the configuration of a memory system 30 in accordance with an embodiment. As illustrated in FIG. 16, the memory system 30 may include the host 31, a memory controller 33, and the memory device 35.

The host 31 may apply the host command HCMD, the host data HDATA, and the host address HADD to the memory controller 33. The host 31 may receive the host data HDATA from the memory controller 33.

The memory controller 33 may receive the host command HCMD, the host data HDATA, and the host address HADD from the host 31, may generate the memory command MCMD, the memory data MDATA, and the memory address MADD, and may apply the memory command MCMD, the memory data MDATA, and the memory address MADD to the memory device 35, to control a data access operation on the memory device 35. The memory controller 33 may receive the memory data MDATA from the memory device 35 during a read operation. The memory controller 33 may be implemented as the memory controller 10, described with reference to FIGS. 1 to 11, or the memory controller 20, described with reference to FIGS. 12 to 15.

The memory device 35 may receive the memory command MCMD, the memory data MDATA, and the memory address MADD from the memory controller 33 and may execute the data access operation.

The memory controller 10, described with reference to FIGS. 1 to 11, and the memory controller 20, described with reference to FIGS. 12 to 15, may be applied to an electronic system including a memory system, a graphic system, a computing system, a mobile system, and the like. For example, referring to FIG. 17, an electronic system 1000, in accordance with an embodiment, may include a data storage unit 1001, a memory controller 1002, a buffer memory 1003, and an input/output interface 1004.

According to a control signal from the memory controller 1002, the data storage unit 1001 may store data (not illustrated) that is applied from the memory controller 1002, reads the stored data (not illustrated), and outputs the read data to the memory controller 1002. The data storage unit 1001 may include a nonvolatile memory that is capable of continuously retaining data that is stored in the data storage unit 1001 even though power supply is cut off. The non-volatile memory may be implemented as a flash memory (NOR flash memory or NAND flash memory), PRAM (Phase Change Random Access Memory), RRAM (Resistive Random Access Memory), STTRAM (Spin Transfer Torque Random Access Memory), or MRAM (Magnetic Random Access Memory).

Figure 17:
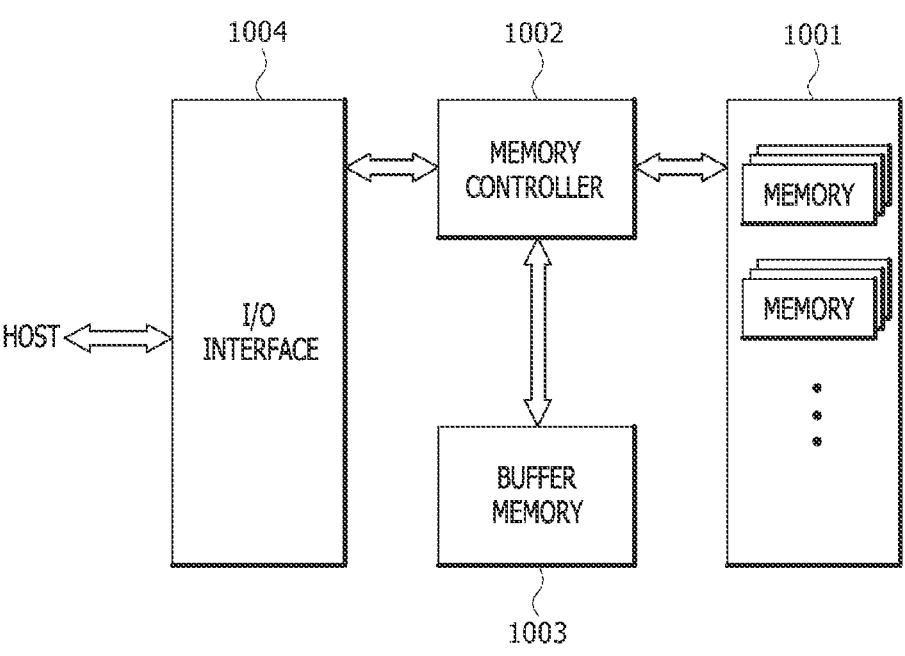
FIG. 17 is a block diagram illustrating the configuration of an electronic system in accordance with an embodiment.

The memory controller 1002 may decode a command that is applied from an external device (host device) through the input/output interface 1004 and may control data that is input/output for the data storage unit 1001 and the buffer memory 1003 according to the decoding result. FIG. 17 illustrates the memory controller 1002 as one block. However, the memory controller 1002 may separately include a controller for controlling the data storage unit 1001 and a controller for controlling the buffer memory 1003 that serves as a volatile memory. The memory controller 1002 may include the memory controller 10 described with reference to FIGS. 1 to 11 or the memory controller 20 described with reference to FIGS. 12 to 15.

The buffer memory 1003 may temporarily store data to be processed by the memory controller 1002, i.e. data (not illustrated) that is input to/output from the data storage unit 1001. The buffer memory 1003 may store data (not illustrated) that is applied from the memory controller 1002 according to a control signal. The buffer memory 1003 may include the memory device 35, described with reference to FIG. 16. The buffer memory 1003 may read the data that is stored in the buffer memory 1003 and may output the read data to the memory controller 1002. The buffer memory 1003 may include a volatile memory, such as DRAM (Dynamic Random Access Memory), mobile DRAM, or SRAM (Static Random Access Memory).

The input/output interface 1004 may provide a physical connection between the memory controller 1002 and an external device (host) such that the memory controller 1002 can receive the control signal for data input to/output from the external device and exchange data with the external device. The input/output interface 1004 may include one of various interface protocols, such as USB (Universal Serial Bus), MMC (Multi-Media Card), PCI-E (Peripheral Component Interconnect-Express), SAS (Serial Attached SCSI), SATA (Serial ATA), PATA (Parallel ATA), SCSI (Small Computer System Interface), ESDI (Enhanced Small Disk Interface), and IDE (Integrated Drive Electronics).

The electronic system 1000 may be used as a secondary memory device or external storage device of the host device. Examples of the electronic system 1000 may include an SSD (Solid State Disk), a USB (Universal Serial Bus) memory, an SD (Secure Digital) card, an mSD (mini Secure Digital) card, a micro SD card, an SDHC (Secure Digital High Capacity) card, a memory stick card, an SM (Smart Media) card, an MMC (Multi-Media Card), an eMMC (embedded MMC), a CF (Compact Flash) card and the like.

Figure 18:
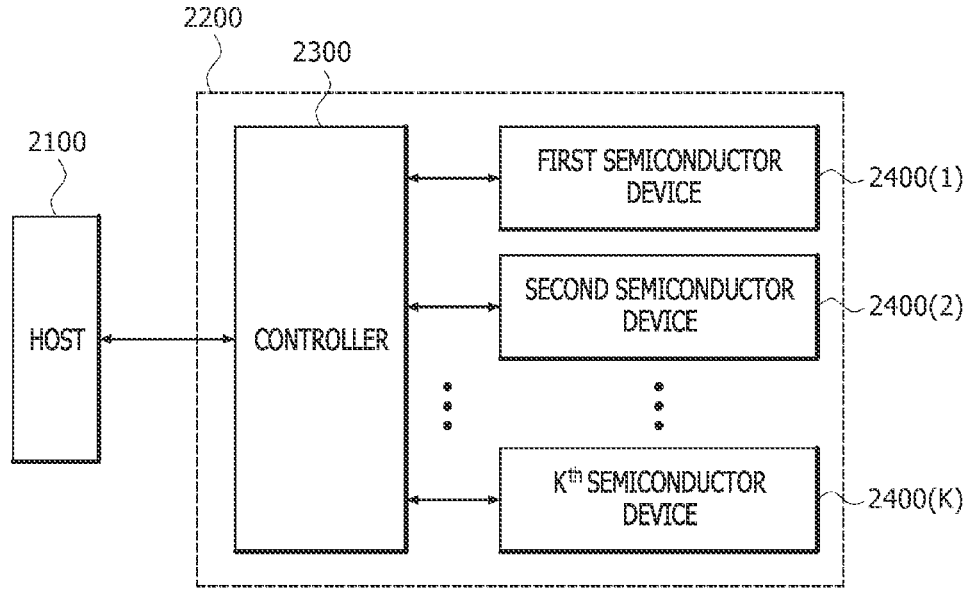
FIG. 18 is a block diagram illustrating the configuration of an electronic system in accordance with another embodiment.

FIG. 18 is a block diagram illustrating the configuration of an electronic system 2000 in accordance with another embodiment. As illustrated in FIG. 18, the electronic system 2000 may include a host 2100 and a memory system 2200.

The host 2100 and the memory system 2200 may transmit/receive signals to/from each other by using an interface protocol. Examples of the interface protocol that are used between the host 2100 and the memory system 2200 may include an MMC (Multi-Media Card), ESDI (Enhanced Small Disk Interface), IDE (Integrated Drive Electronics), PCI-E (Peripheral Component Interconnect-Express), ATA (Advanced Technology Attachment), SATA (Serial ATA), PATA (Parallel ATA), SAS (Serial Attached SCSI), USB (Universal Serial Bus), and the like. The memory system 2200 may include a controller 2300 and memory devices 2400(K:1). The controller 2300 may include the memory controller 10, described with reference to FIGS. 1 to 11, or the memory controller 20, described with reference to FIGS. 12 to 15. Each of the memory devices 2400(K:1) may be implemented as one of a DRAM (Dynamic Random Access Memory), PRAM (Phase change Random Access Memory), RRAM (Resistive Random Access Memory), MRAM (Magnetic Random Access Memory), and FRAM (Ferroelectric Random Access Memory).

Although some embodiments of the present teachings have been disclosed for illustrative purposes, those skilled in the art will appreciate that various modifications, additions and substitutions are possible, without departing from the scope and spirit of the present teachings as defined in the accompanying claims.

What is claimed is:

1. A memory system comprising:
a memory device comprising a plurality of memory cells including a first memory cell accessed during a first read operation; and
a memory controller:
configured to store, as a fail address in a fail address storage circuit, a first internal address that is generated during the first read operation when the first memory cell is determined to be a fail;
configured to error correct memory read data from the first memory cell during the first read operation resulting in output error corrected memory read data; and
configured to store, in an alternative data storage circuit when an error flag is activated, internal read data that is generated during the first read operation as alternative data, wherein the error flag is activated when the memory read data contains an error or when an error in the memory read data is corrected;
configured to output the alternative data as the internal read data when the error flag is activated when a second internal address is equal to the fail address during a second read operation executed after the first read operation; and
configured to output the output error corrected memory read data as the internal read data when the error flag is activated when the second internal address is not equal to the fail address during the second read operation;
wherein the memory controller outputs the internal read data to a host through a host interface.

2. The memory system of claim 1, wherein the memory controller is configured to output the alternative data as the internal read data when a second internal address, generated during a second read operation that is executed after the first read operation, is equal to the fail address.

3. The memory system of claim 2, wherein, when the second internal address is different from the fail address, the memory controller is configured to generate the internal read data based on cell data that is output from at least one memory cell that is accessed by the second internal address.

4. The memory system of claim 1, wherein, when a third internal address that is generated during a write operation that is executed after the first read operation is equal to the fail address, the memory controller is configured to store, as the alternative data, internal write data that is generated from host data transmitted from the host.

5. The memory system of claim 4, wherein, when the third internal address is different from the fail address, the memory controller is configured to generate memory write data in order to store the internal write data in at least one memory cell that is accessed by the third internal address.

6. The memory system of claim 1, wherein the memory controller comprises:
an error correction circuit configured to generate the internal read data and an error flag by executing an error decoding operation based on memory read data; and
a data alternation control circuit configured to store the first internal address as the fail address based on the error flag and configured to store the internal read data as the alternative data.

7. The memory system of claim 6, wherein the memory device is configured to generate a cell syndrome from cell data that is output from at least one memory cell that is accessed by the first internal address and configured to transmit the memory read data, composed of the cell data and the cell syndrome, as memory data to the memory controller.

8. The memory system of claim 7, wherein the error correction circuit is configured to activate the error flag when an error is contained in the cell data based on the cell syndrome that is included in the memory read data.

9. The memory system of claim 7, wherein the error correction circuit is configured to activate the error flag when an error is contained in the cell data and configured to correct the error that is contained in the cell data based on the cell syndrome that is included in the memory read data.

10. The memory system of claim 6, wherein the data alternation control circuit comprises a storage control circuit, a match signal generation circuit, and an alternative data storage circuit, wherein the storage control circuit is configured to control the match signal generation circuit to store the first internal address as the fail address when the error flag is activated during the first read operation and configured to control the alternative data storage circuit to store the internal read data as the alternative data when the error flag is activated during the first read operation.

11. The memory system of claim 6, wherein the data alternation control circuit comprises a match signal generation circuit configured to store the first internal address as the fail address when the error flag is activated during the first read operation,
wherein the match signal generation circuit is configured to generate a match flag and a match signal by comparing a second internal address to the fail address, the second internal address generated during a data access operation that is executed after the first read operation.

12. The memory system of claim 11, wherein the fail address comprises a first fail address and a second fail address,
wherein the match signal generation circuit comprises:
an internal address receiving circuit configured to receive the second internal address;
a fail address storage circuit configured to store the first fail address and the second fail address and configured to generate a first address match signal and a second address match signal by comparing the second internal address to the first fail address and the second fail address; and
a match encoder configured to generate the match flag and the match signal by encoding the first address match signal and the second address match signal.

13. The memory system of claim 11, wherein the data alternation control circuit further comprises an alternative data storage circuit configured to store the internal read data as the alternative data when the error flag is activated during the first read operation,
wherein the alternative data storage circuit is configured to transmit the alternative data, selected based on the match signal, as transmission alternative data, to the error correction circuit during the data access operation or configured to store internal write data, transmitted by the error correction circuit, as the transmission alternative data in alternative data that is selected based on the match signal during the data access operation.

14. The memory system of claim 11, wherein, during the data access operation, the error correction circuit is configured to receive the alternative data as transmission alternative data from the match signal generation circuit based on the match flag and configured to output the transmission alternative data as the internal read data.

15. The memory system of claim 14, wherein the error correction circuit is configured to transmit internal write data, generated from host data that is transmitted from the host based on the match flag, as the transmission alternative data, to the match signal generation circuit during the data access operation, wherein the match signal generation circuit is configured to store the transmission alternative data as the alternative data.

16. A memory controller comprising:

an error correction circuit configured to generate internal read data and an error flag by executing an error decoding operation on memory read data including cell data and a cell syndrome output from a first memory cell of a plurality of memory cells included in a memory device, which first memory cell is accessed during a first read operation and configured to error correct memory read data from the first memory cell during the first read operation resulting in output error corrected memory read data;

a data alternation control circuit configured to:

store, in a fail address storage circuit, a first internal address of the first memory cell, generated during the first read operation, as a fail address based on the error flag;

store, in an alternative data storage circuit, the internal read data as alternative data, wherein the error flag is activated when the memory read data contains an error or when an error in the memory read data is corrected;

configured to output the alternative data as the internal read data when the error flag is activated when a second internal address is equal to the fail address during a second read operation executed after the first read operation;

configured to output the output error corrected memory read data as the internal read data when the error flag is activated when the second internal address is not equal to the fail address during the second read operation; and a read data queue configured to output the internal read data to a host through a host interface.

17. The memory controller of claim 16, wherein, based on the cell syndrome that is included in the memory read data, the error correction circuit is configured to activate the error flag when an error is contained in the cell data.

18. The memory controller of claim 16, wherein, based on the cell syndrome that is included in the memory read data, the error correction circuit is configured to activate the error flag when an error is contained in the cell data and the error that is contained in the cell data is corrected.

19. The memory controller of claim 16, wherein the data alternation control circuit comprises a storage control circuit, a match signal generation circuit, and an alternative data storage circuit, wherein the storage control circuit is configured to control the match signal generation circuit to store the first internal address as the fail address when the error flag is activated during the first read operation and configured to control the alternative data storage circuit to store the internal read data as the alternative data, when the error flag is activated during the first read operation.

20. The memory controller of claim 16, wherein the data alternation control circuit comprises a match signal generation circuit configured to store the first internal address as the fail address when the error flag is activated during the first read operation, wherein the match signal generation circuit is configured to generate a match flag and a match signal by comparing a second internal address to the fail address, the second internal address generated during a data access operation that is executed after the first read operation.

21. The memory controller of claim 20, wherein the fail address comprises a first fail address and a second fail address, wherein the match signal generation circuit comprises:

an internal address receiving circuit configured to receive the second internal address;

a fail address storage circuit configured to store the first fail address and the second fail address and configured to generate a first address match signal and a second address match signal by comparing the second internal address to the first fail address and the second fail address; and a match encoder configured to generate the match flag and the match signal by encoding the first address match signal and the second address match signal.

22. The memory controller of claim 20, wherein the data alternation control circuit further comprises an alternative data storage circuit configured to store the internal read data as the alternative data when the error flag is activated during the first read operation, wherein the alternative data storage circuit is configured to transmit the alternative data, selected based on the match signal, as transmission alternative data, to the error correction circuit during the data access operation or configured to store internal write data, transmitted by the error correction circuit, as the transmission alternative data in alternative data that is selected based on the match signal during the data access operation.

23. The memory controller of claim 20, wherein, during the data access operation, the error correction circuit is configured to receive the alternative data as transmission alternative data from the match signal generation circuit based on the match flag and configured to output the transmission alternative data as the internal read data.

24. The memory controller of claim 20, wherein the error correction circuit is configured to transmit internal write data, generated from host data that is transmitted from the host based on the match flag, as the transmission alternative data, to the match signal generation circuit during the data access operation, wherein the match signal generation circuit is configured to store the transmission alternative data as the alternative data.

25. A memory system comprising:

a memory device comprising a plurality of memory cells including a first memory cell; and a memory controller comprising:

an event signal generation circuit configured to generate an event signal;

a self command generation circuit configured to generate a self command for a self read operation in response to activation of the event signal;

a self address generation circuit configured to generate a self address for the self read operation in response to activation of the event signal; and an error correction circuit configured to, during the self read operation, generate internal read data and an error flag by executing an error decoding operation on memory read data including cell data and configured to error correct memory read data from the first memory cell during the first read operation resulting in output error corrected memory read data, wherein the error flag is activated when the memory read data contains an error or when an error in the memory read data is corrected; and a data alternation control circuit:

configured to store the self address as a fail address in a fail address storage circuit based on the error flag when the first memory cell is determined to be a fail during the self read operation;

configured to store, in an alternative data storage circuit when the error flag is activated, the internal read data generated during the self read operation as alternative data;

configured to output the alternative data as internal read data when the error flag is activated when a second internal address is equal to the fail address during a second read operation executed after the first read operation;

configured to output the output error corrected memory read data as the internal read data when the error flag is activated when the second internal address is not equal to the fail address during the second read operation; and a read data queue configured to output the internal read data to a host through a host interface.

26. The memory system of claim 25, wherein the first memory cell is determined to be a fail when an error is detected in the first memory call.

27. The memory system of claim 25, wherein the self command comprises an identification bit distinguished from a host command from the host.

28. The memory system of claim 25, wherein output of the the alternative data blocks access of an error in the first memory cell.

29. The memory system of claim 25, wherein the memory controller is configured to, when the alternative data is output as the internal read data, block an error from the first memory cell that is determined to be a fail.

30. The memory controller of claim 16, further configured to, when the alternative data is output as the internal read data, block an error from the first memory cell that is determined to be a fail.

31. The memory system of claim 1, wherein the memory controller is configured to, when the alternative data is output as the internal read data, block an error from the first memory cell that is determined to be a fail.

\* \* \* \* \*